(12) United States Patent
Kamikawa (10) Patent No.: US 8,999,486 B2
(45) Date of Patent: Apr. 7, 2015

(54) COMPOSITE MOLDED ARTICLE

(75) Inventor: Yoshikazu Kamikawa, Aichi (JP)

(73) Assignee: Tokai Kogyo Co., Ltd., Obu (JP)

( * ) Notice: Subject to any disclaimer, the term of this patent is extended or adjusted under 35 U.S.C. 154(b) by 364 days.

(21) Appl. No.: 13/371,822

(22) Filed: Feb. 13, 2012

(65) Prior Publication Data

US 2012/0207970 A1    Aug. 16, 2012

(30) Foreign Application Priority Data

Feb. 15, 2011   (JP) ................. 2011-030063

(51) Int. Cl.
| | |
|---|---|
| *B32B 3/10* | (2006.01) |
| *F21V 31/03* | (2006.01) |
| *B01D 53/22* | (2006.01) |
| *F16K 24/04* | (2006.01) |
| *B32B 3/02* | (2006.01) |
| *B32B 3/06* | (2006.01) |
| *B32B 3/24* | (2006.01) |
| *B32B 3/28* | (2006.01) |
| *B32B 5/14* | (2006.01) |

(Continued)

(52) U.S. Cl.
CPC ............... *B60Q 1/007* (2013.01); *B32B 3/266* (2013.01); *B32B 3/28* (2013.01); *B32B 3/06* (2013.01); *B32B 5/14* (2013.01); *F16K 24/04* (2013.01); *B32B 1/08* (2013.01); *F21V 31/03* (2013.01); *F21S 48/332* (2013.01); *B32B 3/30* (2013.01); *B32B 3/263* (2013.01); *B01D 53/22* (2013.01); *Y10T 428/24322* (2015.01); *F21S 48/335* (2013.01); *Y10S 277/928* (2013.01)

(58) Field of Classification Search
CPC .......... F21V 31/03; F21S 48/30; F21S 48/33; F21S 48/332; F21S 48/335; F21S 48/337
See application file for complete search history.

(56) References Cited

U.S. PATENT DOCUMENTS 3,805,991 A * 4/1974 Cheladze et al. ............. 220/373
5,215,312 A * 6/1993 Knappe et al. ................ 277/312
(Continued)

FOREIGN PATENT DOCUMENTS

| EP | 706954 A1 * | 4/1996 | ............. B65D 51/16 |
| EP | 816043 A1 * | 1/1998 | ............. B29C 45/16 |

(Continued)

OTHER PUBLICATIONS

Machine Translation of EP 816043 A1, Jan. 1998.*
(Continued)

*Primary Examiner* — Jeff Vonch
(74) *Attorney, Agent, or Firm* — Oliff PLC (57) ABSTRACT

A composite molded article comprising: a main body portion including, a bottom wall portion formed of an elastically deformable polymer material, and a peripheral wall portion protruding so as to surround a peripheral edge of the bottom wall portion and formed of an elastically deformable polymer material; a vent hole passing through the bottom wall portion; and a gas permeable membrane integrally connected to the main body portion and is permeable to gas but is impermeable to liquid, wherein the gas permeable membrane is arranged to the bottom wall portion so as to cover the vent hole and connected to the bottom wall portion at a periphery of the vent hole, and wherein the bottom wall portion includes at least one rigid body portion which is more difficult to be deformed than the bottom wall portion at an outer peripheral part of the gas permeable membrane.

7 Claims, 9 Drawing Sheets

(51) Int. Cl.
*B60Q 1/00* (2006.01)
*B32B 3/26* (2006.01)
*F21S 8/10* (2006.01)
*B32B 3/30* (2006.01)
*B32B 1/08* (2006.01)

(56) References Cited

U.S. PATENT DOCUMENTS

| | | | | |
|---|---|---|---|---|
| 6,005,233 | A * | 12/1999 | Wyatt | 219/621 |
| 6,210,014 | B1 * | 4/2001 | Kubizne et al. | 362/96 |
| 6,827,232 | B1 | 12/2004 | Hara et al. | |
| 7,083,660 | B2 | 8/2006 | Hara et al. | |
| 7,255,354 | B2 | 8/2007 | Tamura et al. | |
| 7,344,578 | B2 * | 3/2008 | Origlia | 55/385.4 |
| 7,442,334 | B2 | 10/2008 | Hara et al. | |
| 8,016,142 | B2 * | 9/2011 | Renz | 215/11.5 |
| 8,475,575 | B2 * | 7/2013 | Ono et al. | 96/4 |
| 8,734,573 | B2 * | 5/2014 | Ono et al. | 96/4 |
| 2003/0133310 | A1 * | 7/2003 | VanDuyn et al. | 362/547 |
| 2007/0222113 | A1 | 9/2007 | Tamura et al. | |
| 2008/0092741 | A1 * | 4/2008 | Furuuchi et al. | 96/9 |
| 2009/0084078 | A1 * | 4/2009 | Furuyama et al. | 55/385.4 |
| 2009/0268475 | A1 * | 10/2009 | Ball et al. | 362/373 |

FOREIGN PATENT DOCUMENTS

| | | | | |
|---|---|---|---|---|
| GB | 2370347 A * | 6/2002 | | F21V 17/00 |
| JP | 07320507 A * | 12/1995 | | F21Q 1/00 |
| JP | A-2001-155814 | 6/2001 | | |
| JP | A-2001-168543 | 6/2001 | | |
| JP | A-2002-347068 | 12/2002 | | |
| JP | A-2003-063549 | 3/2003 | | |
| JP | A-2003-152347 | 5/2003 | | |
| JP | A-2005-071638 | 3/2005 | | |
| JP | A-2005-243829 | 9/2005 | | |
| JP | 2011181220 A * | 9/2011 | | |
| WO | WO 2007141232 A1 * | 12/2007 | | B01D 19/00 |

OTHER PUBLICATIONS

Apr. 16, 2014 Notification of Reasons for Refusal issued in Japanese Patent Application No. 2011-030063 (with translation).

* cited by examiner

COMPOSITE MOLDED ARTICLE

CROSS-REFERENCE TO RELATED APPLICATIONS

This application claims priority from Japanese Patent Application No. 2011-030063 filed on Feb. 15, 2011, the entire contents of which are incorporated herein by reference.

TECHNICAL FIELD

Aspects of the present invention relate to a composite molded article including a main body portion having flexibility and a gas permeable membrane that is permeable to gas but is impermeable to liquid.

BACKGROUND

A composite molded article having a gas permeable membrane that is permeable to gas but is impermeable to liquid in a main body portion is used in various industrial fields. Such a composite molded article is used, for example, for preventing water droplets or dust from entering an enclosed space sealed by the main body portion at a part where the molded article is attached and for preventing moisture from staying in the enclosed space (namely, to ensure a ventilation). A so-called lamp cover for closing an opening formed in a lamp housing (a lamp holding portion) such as a head lamp or a tail lamp provided in a vehicle, which accommodates a light source body (a lamp, a bulb) of a lighting device, is a typical example of this kind of composite molded article. A connector case that accommodates various kinds of electronic device or a case cover for covering the case is another example of the composite molded article. A cultivating case for cultivating farm products such as mushrooms or a case cover thereof is another example of the composite molded article.

For example, JP-A-2005-71638 discloses a tubular component portion of a lamp housing, which has a gas permeable membrane (a filter) in a vent passage, as a composite molded article forming a haze preventing structure of a lighting device for a vehicle. Further, JP-A-2002-347068 discloses a molded article having a gas permeable membrane (a gas permeable sheet) connected to a vent opening formed in a cover body of a connector case. JP-A-2001-155814, JP-A-2003-63549 and JP-A-2003-152347 also disclose a usual technique related to a composite molded article having a gas permeable membrane.

SUMMARY

In the lamp housing disclosed in JP-A-2005-71638, the gas permeable membrane is arranged at a position where it is difficult to replace the gas permeable membrane by another membrane, making it unfavorable for a maintenance work such as exchanging the gas permeable membrane. It is more favorable for the maintenance work to form the gas permeable membrane to a member that can be easily detached from the lamp housing (for example, a lamp cover or the like).

However, when a main body portion of such cover is formed of a flexible material in order to easily attach and detach the main body portion relative to a predetermined attaching part (typically, the main body portion is formed of elastically deformable rubber, other elastomers or a synthetic resin), it becomes difficult to stably connect (bond) the gas permeable membrane integrally to the main body portion. Namely, in such a flexible main body portion, during an attaching and detaching operation at the predetermined attaching part, since the main body portion is highly deformed (for example, bent), the gas permeable membrane itself is also deformed due to the deformation of the main body portion. As a result, the gas permeable membrane itself or a gas permeable membrane connecting (bonding) portion may be damaged. Even if the gas permeable membrane itself is not damaged, a gas permeability or a sealing property may be deteriorated (lowered) at the gas permeable membrane connecting portion.

Accordingly, a composite molded article used for a lamp cover having the main body portion with a flexibility as described above or other uses which is favorable for the maintenance work and has a structure that hardly applies a physical influence to the gas permeable membrane connected to the main body portion and the gas permeable membrane connecting portion even when the main body portion itself is deformed (for example, bent) during the attaching and detaching operation, is desired.

The present invention is devised in order to solve problems of the composite molded article having the above-described property and uses and it is an object of the present invention to provide a composite molded article for a lamp cover or other uses which includes a main body portion having flexibility and a gas permeable membrane provided to the flexible main body portion and has a structure in which a physical state of the gas permeable membrane can be stably maintained even when the main body portion of the molded article is deformed during an attaching and detaching operation.

According to an aspect of the invention, there is provided a composite molded article including: a main body portion configured to be attached to and detached from an attaching body, the main body portion including, a bottom wall portion formed in a plate shape and formed of an elastically deformable polymer material, and a peripheral wall portion protruding so as to surround a peripheral edge of the bottom wall portion and formed of an elastically deformable polymer material; a vent hole passing through the bottom wall portion in a thickness direction of the bottom wall portion; and a gas permeable membrane integrally connected to the main body portion and is permeable to gas but is impermeable to liquid, wherein the gas permeable membrane is arranged to the bottom wall portion so as to cover the vent hole and connected to the bottom wall portion at a periphery of the vent hole, and wherein the bottom wall portion includes at least one rigid body portion which is more difficult to be deformed than the bottom wall portion at an outer peripheral part of the gas permeable membrane.

DETAILED DESCRIPTION

Hereinafter, preferable exemplary embodiments of the present invention will be described. In the specification, matters other than matters especially stated in the specification and necessary for embodying the present invention (for example, general matters related to a production of a main body portion (for example, a lamp cover) by an injection molding) may be regarded as a design matter of a person with ordinary skill in the art based on a related-art technique. The present invention can be embodied in accordance with matters disclosed in this specification and the drawings and a technical common practice in the field concerned.

Hereinafter, by referring to the drawings, as one of preferable exemplary embodiments (a first exemplary embodiment) of a composite molded article of the present invention, a lamp cover configured to be attached to and detached from a lamp housing as an attaching body will be described in detail as an example. However, this does not mean that an object, to which the present invention is applied, is limited to a lamp cover.

Figure 1:
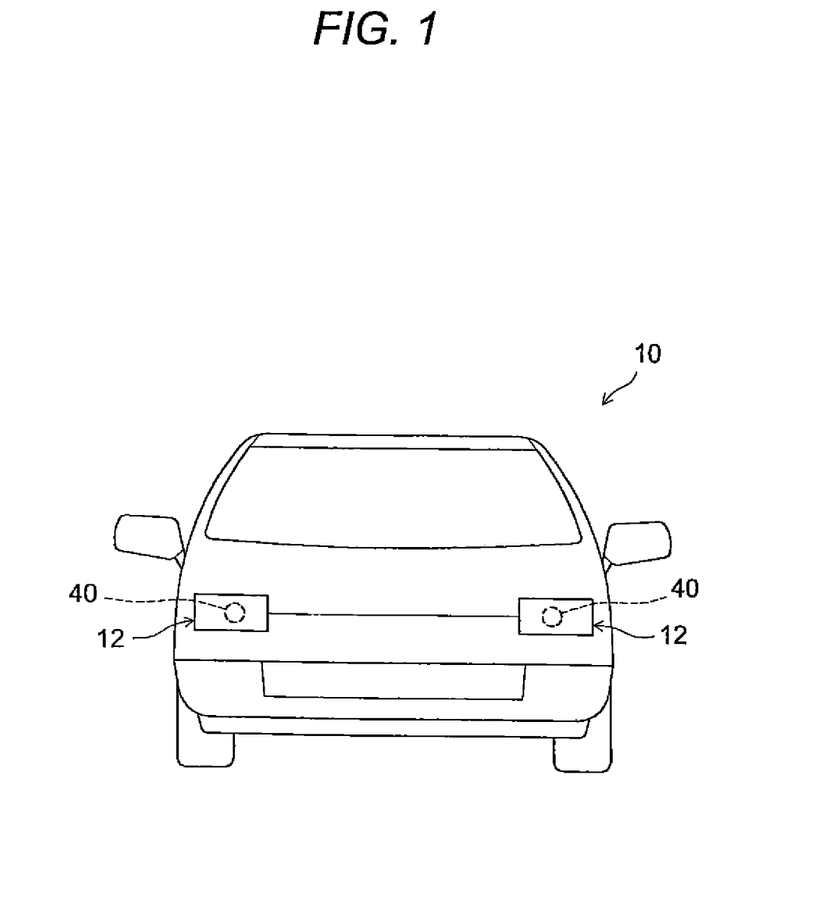
FIG. 1 is a front view schematically showing a vehicle (a motor vehicle) to which a lamp cover according to one exemplary embodiment of the present invention is attached.

FIG. 1 is a front view schematically showing a vehicle (a motor vehicle) 10 provided with a lamp cover (a composite molded article) 40 according to the present exemplary embodiment. As shown in FIG. 1, the vehicle 10 includes a pair of head lamps 12, 12 similarly to an ordinary motor vehicle. The head lamp 12 includes a lamp housing 14 (see FIG. 2) as an attaching body, which will be described later, and the lamp cover 40 which is configured to be attached to and detached from the lamp housing 14.

Figure 2:
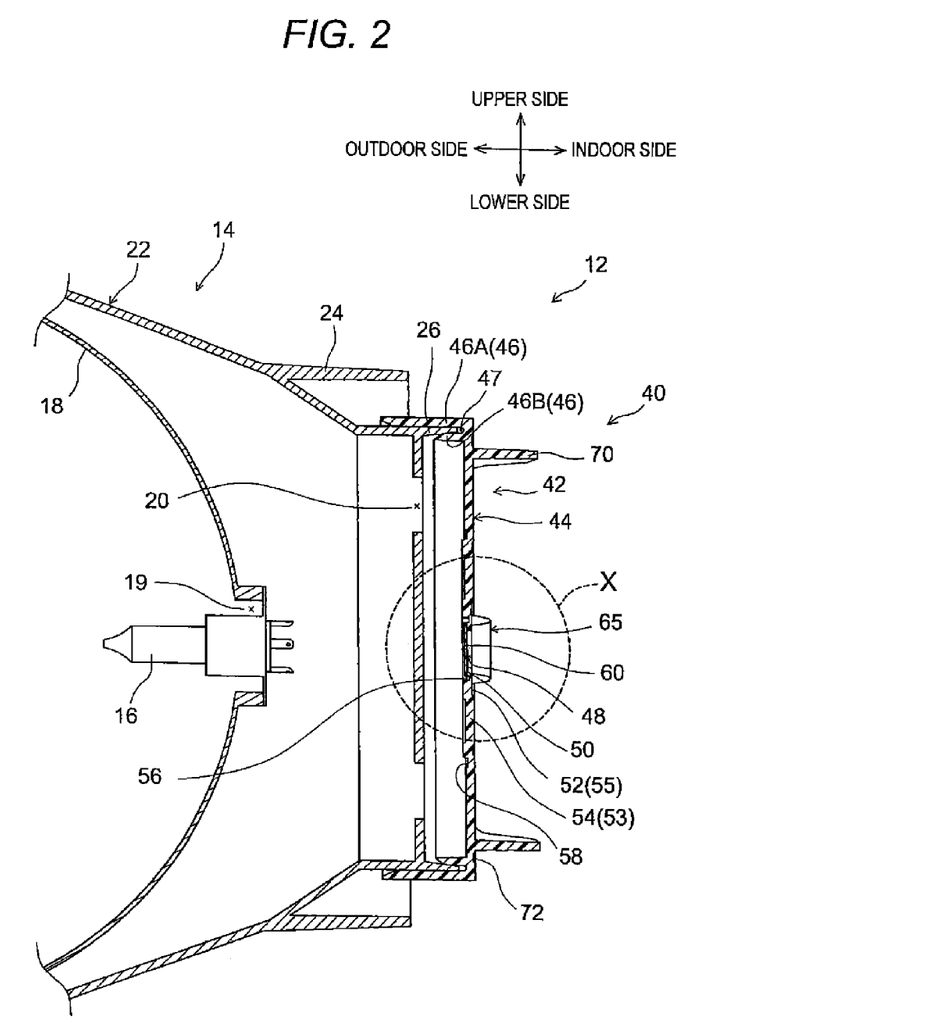
FIG. 2 is a sectional view showing a state that the lamp cover according to the one exemplary embodiment of the present invention is attached to a lamp housing.

FIG. 2 is a sectional view showing a state where the lamp cover 40 according to the present exemplary embodiment is attached to the lamp housing 14. As shown in FIG. 2, the head lamp 12 includes the lamp housing (the attaching body) 14 that accommodates a light source body such as a bulb 16. For example, the lamp housing 14 may be a box-shape. The lamp housing 14 includes an outer frame portion 22 made of a resin material or a metal material and a reflector (a reflecting plate) 18 arranged inside the outer frame portion 22. In the outer frame portion 22, an outer rib 24 protruding outward (an indoor side) from the outer frame portion 22 and an inner rib 26 formed in an inner peripheral side than the outer rib 24 are respectively integrally formed. The inner rib 26 according to the present exemplary embodiment is formed in a cylindrical shape having an opening portion 20 formed for a maintenance such as an exchange of the bulb 16. A main body portion 42 of the lamp cover 40 is attached to the inner rib 26 so as to close the opening portion 20 to seal a part between the lamp cover 40 and the lamp housing 14. The shape of the inner rib 26 is not limited to the cylindrical shape, and may be a polygonal shape such as a square shape. A reflector opening portion 19 for attaching the bulb 16 is formed to the reflector 18, and the bulb 16 is attached so as to close the opening portion 19. The bulb 16 is connected to a socket that is not shown in the drawing.

Hereinafter, the lamp cover (the composite molded article) 40 according to the present exemplary embodiment will be described in detail by referring to FIG. 2 to FIG. 6.

As shown in FIG. 2, the lamp cover 40 according to the present exemplary embodiment includes the main body portion 42, which is configured to be attached to and detached from the lamp housing 14 as the attaching body, and a gas permeable membrane 60 integrally connected to the main body portion 42.

The main body portion 42 includes a bottom wall portion 44 formed in a plate shape and formed of an elastically deformable polymer material (hereinafter referred to as "elastic polymer material") and a peripheral wall portion 46 protruding so as to surround a peripheral edge of the bottom wall portion 42 and formed of the elastic polymer material. Specifically, the main body portion 42 is formed in a cylindrical shape by the bottom wall portion 44 formed in a disk shape and the peripheral wall portion 46 formed in a tubular shape so as to protrude in a single direction from the peripheral edge of the bottom wall portion 44. The bottom wall portion 44 and the peripheral wall portion 46 are integrally formed by injection molding.

As long as the main body portion 42 has a shape capable of being attached to and detached from the lamp housing 14 as the attaching body (representatively, the inner rib 26) and is configured to close (namely, seal) the opening portion 20 of the lamp housing 14, the shape of the main body portion 42 is not especially limited and may be a rectangular prism, a triangular prism or other shape.

As the elastic polymer material for forming the above-described main body portion 42 (namely, the bottom wall portion 44 and the peripheral wall portion 46), for example, vulcanized elastic rubber (for example, a material including ethylene-propylene-diene rubber (EPDM) as a main component); thermoplastic elastomer such as thermoplastic olefine elastomer (TPO), thermoplastic styrene elastomer (TPS), etc; thermoplastic resin such as polyvinyl chloride resin (PVC), etc., can be used. Especially, when the lamp cover is formed as the composite molded article, a material, for example, TPO may be preferably used which does not generate gas that fogs the head lamp 12 during a turning-on operation of the bulb 16 or applies bad influences to various devices mounted in the lamp housing 14.

Further, elastic polymer material whose hardness is set to, for example, A70 to A90 (a value measured in accordance with a type A durometer prescribed by JIS K6253 is to be used) may be preferably used as the elastic polymer material for forming the above-described main body portion 42.

Figure 3:
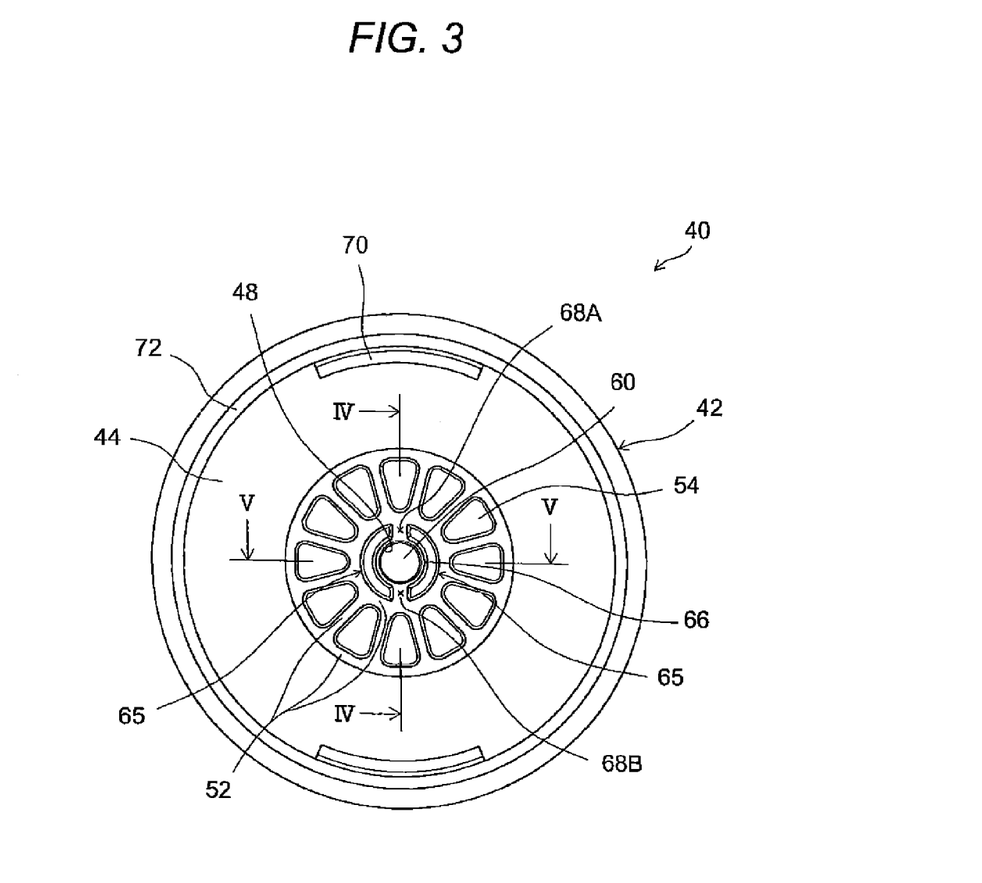
FIG. 3 is a plan view schematically showing the lamp cover according to the one exemplary embodiment of the present invention.
Figure 4:
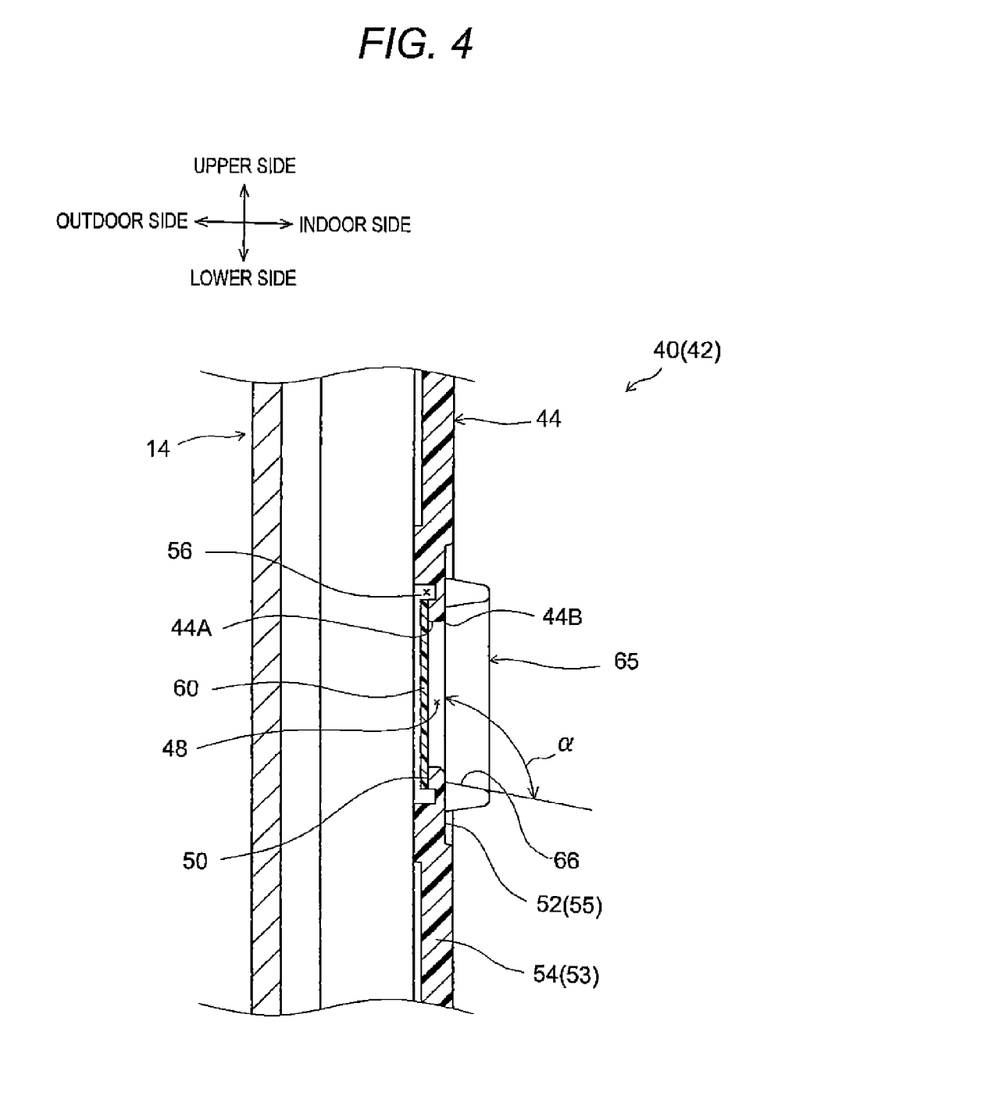
FIG. 4 is an enlarged sectional view of a main part shown by enlarging a part surrounded by a dotted line X in FIG. 2.

FIG. 3 is a plan view schematically showing the lamp cover 40 according to the present exemplary embodiment. FIG. 4 is an enlarged sectional view of a main part shown by enlarging a part surrounded by a dotted line X in FIG. 2 and a sectional view taken along a line IV-IV in FIG. 3.

As shown in FIG. 3 and FIG. 4, in a central part of the bottom wall portion 44, a circular vent hole 48 which passes through the bottom wall portion 44 in a thickness direction thereof is formed. The vent hole 48 is closed by the below-described gas permeable membrane 60.

As shown in FIG. 4, in an inner wall surface 44A of the bottom wall portion 44 forming the vent hole 48, an edge of the inner wall surface 44A is chamfered (corner cut) to form a chamfered portion 44B. Accordingly, liquid (water droplet or the like) which enters the vent hole 48 to adhere to an outer surface (a surface opposite to a face facing the lamp housing 14) of the gas permeable membrane 60 is easily discharged to an outer part (outside the bottom wall portion 44) of the vent hole 48. The shape of the vent hole 48 is not limited to the circular shape and may be rectangular or elliptic. A position where the vent hole is formed need not be a center of the bottom wall portion 44.

As shown in FIG. 4, the gas permeable membrane 60 is arranged to the bottom wall portion 44 so as to cover an entire part of the vent hole 48 and is integrally connected to the bottom wall portion 44 at the periphery of the vent hole 48 to close the vent hole 48. Specifically, as shown in FIG. 2 and FIG. 4, a surface (namely, a surface facing the lamp housing 14, hereinafter may be referred to as "surface of a back side") of the surfaces of the bottom wall portion 44 which is located at the lamp housing 14 side when the main body portion 42 is attached to the inner rib 26 of the lamp housing 14 is integrally connected to the gas permeable membrane 60 to form a gas permeable membrane connecting portion 50. Since the gas permeable membrane 60 is connected to the back side surface of the bottom wall portion 44, an external member is restrained from coming into contact with the gas permeable membrane connecting portion 50 of the gas permeable membrane 60 and the bottom wall portion 44. Thus, the gas permeable membrane 60 itself or the gas permeable membrane connecting portion 50 can be restrained from being damaged.

As long as the shape of the gas permeable membrane 60 can cover the entire part of the vent hole 48 and close the vent hole 48, the shape of the gas permeable membrane 60 is not especially limited. Typically, the gas permeable membrane 60 is formed so as to have a shape similar to that of the vent hole 48. In the present exemplary embodiment, the gas permeable membrane 60 is formed in a circular shape like the shape of the vent hole 48.

As the gas permeable membrane 60, a gas permeable membrane having a property that is permeable to gas but is impermeable to liquid can be used without a special limitation. A gas permeable membrane that is formed of polytetrafluoroethylene resin (PTFE) is a representative example. For example, a trade name "Goatex (a registered trade mark)" of W. L. Gore & Associates, Inc., a trade name "Microtex (a registered trade mark)" of Nitta Denko Corporation, etc., may be preferably used.

The gas permeable membrane 60 has innumerable micro holes having irregular shapes, the size of which being about 0.05 μm to 20 μm. These micro holes transmit water vapor and water in atmospheric air whose sizes are about 0.0004 μm and atmospheric gas (for example, nitrogen gas, oxygen gas, etc.) smaller than the water and the water vapor. However, the micro holes prevent liquid such as water droplets or oil droplets whose sizes are larger than 20 μm and a solid foreign material such as dust from being transmitted. As for the thickness of the gas permeable membrane 60, the gas permeable membrane having the thickness of about 50 μm to 200 μm can be suitably selected and used.

In order to improve a strength of the gas permeable membrane 60, a cloth-shaped reinforcing body in (non-woven fabric, woven fabric or the like), which is formed with a resin material such as fibrous polyamide, polyester, polyolefine, may be attached to the gas permeable membrane 60 by thermal welding or bonding. Since the cloth-shaped reinforcing body (typically, the non-woven fabric) has innumerable voids having irregular shapes and is not dissolved and deteriorated even when the reinforcing body comes into contact with water, the cloth-shaped reinforcing body can be preferably used as the reinforcing body. When the cloth-shaped reinforcing body such as the non-woven fabric is stuck to the gas permeable membrane 60, the gas permeable membrane 60 is directly connected to the bottom wall portion 44 so that the liquid (for example, the water droplets) may be effectively prevented from passing through the vent hole 48.

Figure 5:
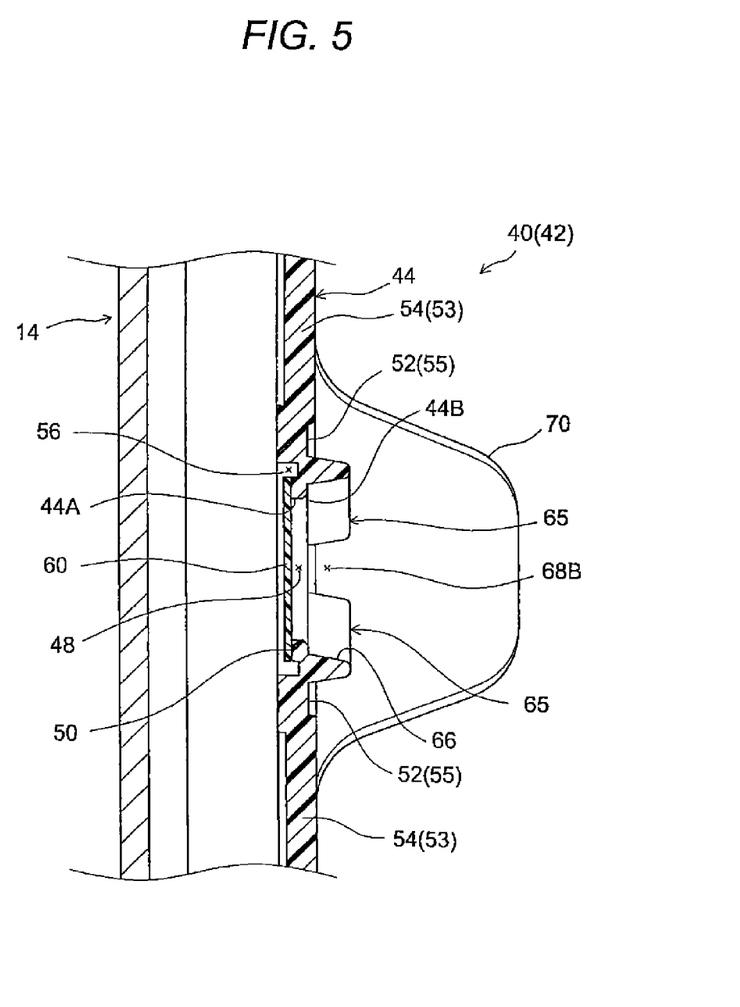
FIG. 5 is a sectional view taken along a line V-V in FIG. 3.

FIG. 5 is a sectional view taken along a line V-V in FIG. 3. As shown in FIG. 3 and FIG. 5, in the bottom wall portion 44 according to the present exemplary embodiment, on a surface (namely, an opposite surface to the surface facing the lamp housing 14. Hereinafter, occasionally referred to as "a surface of a front side") of the surfaces of the bottom wall portion 44 which is opposite to the surface (the surface of the back side) located in the lamp housing 14 side when the main body portion 42 is attached to the inner rib 26 of the lamp housing 14, two rigid body portions 65 and 65 are provided which are more difficult to be deformed than the bottom wall portion 44 at an outer peripheral part (namely, in the vicinity of an outer periphery of the vent hole 48) of the gas permeable membrane 60.

The rigid body portion 65 according to the present exemplary embodiment is formed by at least one partially thick part of the bottom wall portion 44. Specifically, as shown in FIG. 2 and FIG. 4, the rigid body portion 65 is preferably formed to protrude (toward the indoor side) in the direction away from the lamp housing 14 when the main body portion 42 is attached to the lamp housing (the attaching body) 14. The rigid body portion 65 according to the present exemplary embodiment is formed so as to protrude in the shape of a curved wall.

As shown in FIG. 4, an inner wall surface 66 of the rigid body portion 65 is preferably formed so as to be inclined by a predetermined angle α (α is an obtuse angle, for example, about 95 degrees to 135 degrees). According to such a structure, even when the liquid (for example, the water droplets) adheres to the rigid body portion 65, the liquid does not stay at the rigid body portion 65 and is easily discharged to an external part of the rigid body portion 65.

As shown in FIG. 3, the rigid body portion 65 according to the present exemplary embodiment is formed in the shape of a circular arc in plan view and arranged so as to surround the vent hole 48. As shown in FIG. 2, at least a part of the rigid body portion 65 is preferably formed so as to extend along a direction in which a deformation of the bottom wall portion 44 is prevented (namely, a direction in which a bending stress applied to the bottom wall portion 44 is prevented) when the bottom wall portion 44 is deformed in the direction away from the lamp housing 14 to detach the lamp cover 40 from the lamp housing 14. In other words, an entire longitudinal direction of the rigid body portion 65 is preferably arranged substantially in parallel with a line that connects a starting point of the deformation of the bottom wall portion 44 to a center of the main body portion 42. Further, the rigid body portion 65 is preferably extended over a range longer than a diameter of the gas permeable membrane 60.

Further, as shown in FIG. 3, the rigid body portions 65, 65 are preferably arranged with spaces provided between them. When the rigid body portions 65, 65 are arranged in such a way, two broken portions (gaps) 68A and 68B are formed between the rigid body portions 65, 65. As shown in FIG. 3 and FIG. 5, since the broken portion 68B according to the present exemplary embodiment is formed at a lower side from a lower end part of the vent hole 48 (in a vertical direction) when the main body portion 42 is attached to the lamp housing 14, the liquid that enters the vent hole 48 to stick to an outer surface of the gas permeable membrane 60 does not stay at the outer surface of the gas permeable membrane 60 for a long period and is easily discharged to an external of the bottom wall portion 44 through the broken portion 68B. The number or the arrangement of the rigid body portions and the broken portions is not limited to that of the present exemplary embodiment and may be suitably changed depending on a direction in which the main body portion 42 is attached to the lamp housing 14 or the deforming direction of the bottom wall portion.

The rigid body portion 65 may be formed with the same material as that of the bottom wall portion 44 or may be formed with a material higher in its hardness and rigidity than those of the polymer material of the bottom wall portion 44. Further, the rigid body portion 65 may be formed together with the bottom wall portion 44 by, for example, injection molding, or a previously formed rigid body portion 65 may be connected to the surface of the front side of the bottom wall portion 44. A connecting method is not especially limited as long as a sufficient connecting strength can be obtained between the rigid body portion 65 and the bottom wall portion 44. For example, the rigid body portion 65 and the bottom wall portion 44 can be chemically connected by, for example, an ultrasonic welding or a thermal welding, or can be physically connected by using an adhesive agent or a viscous tape.

As shown in FIG. 3, the bottom wall portion 44 includes an uneven part having recessed portions 52 formed in recessed shapes and protruding portions 54 formed in protruding shapes at a peripheral part of the rigid body portion 65. The recessed portions 52 are formed to radiate from the vent hole 48 and the protruding portions 54 are formed at both sides of the recessed portions 52. At this time, as shown in FIG. 3, the recessed portions 52 and the protruding portions 54 are preferably formed symmetrically with respect to the center of the vent hole 48 or linearly symmetrically with respect to a center line of the vent hole 48 (an arbitrary straight line passing the center of the vent hole 48). The protruding portions 54 of the present exemplary embodiment are surrounded by the recessed portions 52 over an entire circumference thereof.

In the uneven part of the bottom wall portion 44, a thickness of the recessed portions 52 is formed to be substantially the same as a thickness of the protruding portions 54. When the thickness of the recessed portions 52 and the protruding portions 54 is set constant as far as possible, the deformation (a sink mark or a warp) during a molding operation or after a molding operation due to the difference of thicknesses between the recessed portions 52 and the protruding portions 54 can be suppressed. The shape and the number of the protruding portions 54 and positions where the protruding portions 54 are formed are not especially limited, and may be respectively determined in accordance with positions where for example, protruding portions 70, which will be described late, are arranged.

Figure 6:
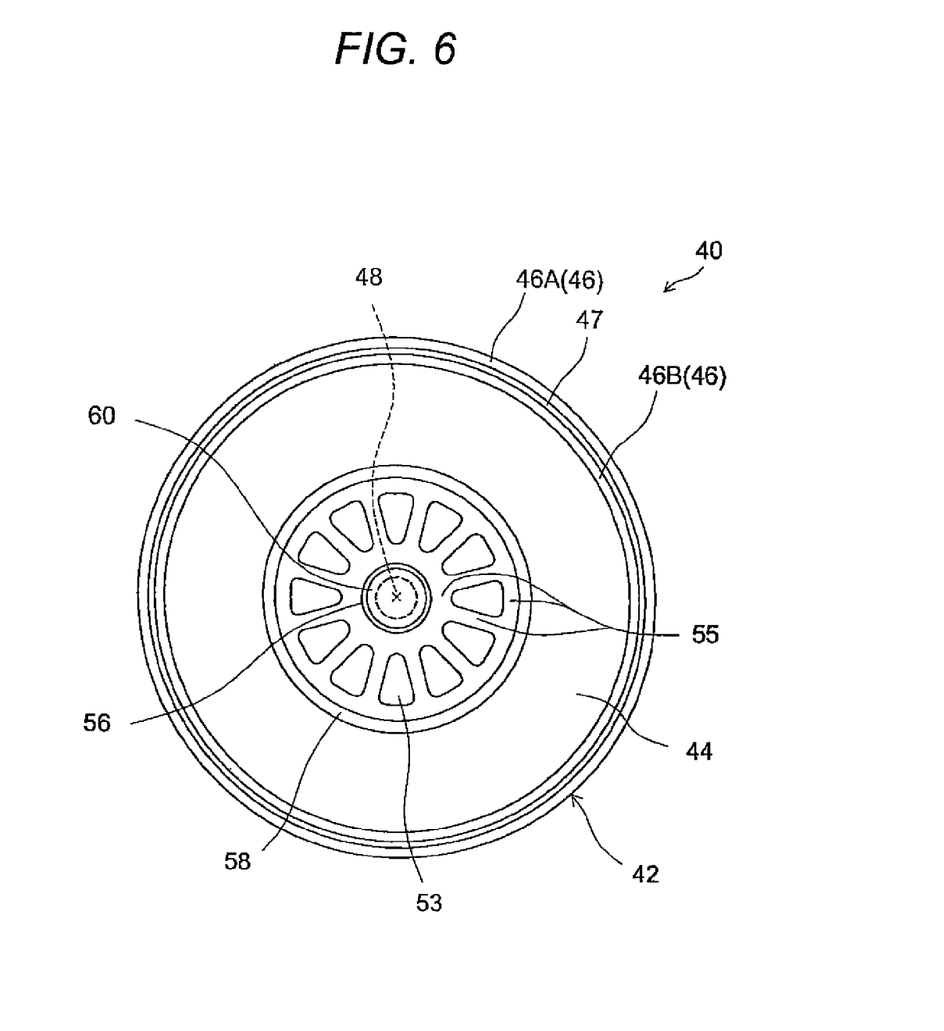
FIG. 6 is a back side view of the lamp cover according to the one exemplary embodiment of the present invention seen from the lamp housing side.

FIG. 6 is a back surface view showing that the lamp cover 40 according to the present exemplary embodiment is seen from the lamp housing 14 side. The recessed portions 52 formed in the recessed shapes in FIG. 3 correspond to back side protruding portions 55 which are formed in protruding shapes in FIG. 6. Further, the protruding portions 54 formed in the protruding shapes in FIG. 3 correspond to recessed portions 53 at the back side which are formed in recessed shapes in FIG. 6.

As shown in FIG. 4 and FIG. 6, the bottom wall portion 44 includes a first recessed groove 56 formed in a recessed shape so as to surround a periphery of the gas permeable membrane connecting portion 50 (see FIG. 4) at the back side of the bottom wall portion 44. When the bending stress is applied to the bottom wall portion 44, since the bottom wall portion 44 is deformed (bent) at the first recessed groove 56, a stress applied to the gas permeable membrane connecting portion 50 located at an inner peripheral side of the first recessed groove 56 can be more greatly reduced than that when the first recessed groove 56 is not provided. Further, as shown in FIG. 2 and FIG. 6, the bottom wall portion 44 includes a second recessed groove 58 formed in a recessed shape so as to surround a periphery of the back side protruding portions 55 at an outer peripheral part of the back side protruding portions 55.

As shown in FIG. 2 and FIG. 6, the peripheral wall portion 46 includes an outer peripheral wall portion 46A protruding toward the lamp housing 14 from the peripheral edge of the bottom wall portion 44 and an inner peripheral wall portion 46B formed at an inner peripheral side from the outer peripheral wall portion 46A. Between the outer peripheral wall portion 46A and the inner peripheral wall portion 46B, an accommodating recessed groove 47 is formed which can be fitted to a peripheral edge (that is, the inner rib 26) of the lamp housing (the attaching body) 14. Edges of inner wall surfaces (surfaces facing the accommodating recessed groove 47) of the outer peripheral wall portion 46A and the inner peripheral wall portion 46B are preferably chamfered (corner cut). Since the peripheral wall portion 46 is chamfered, when the lamp cover 40 is attached to the lamp housing 14, the inner rib 26 can be easily inserted into the accommodating recessed groove 47.

In order to improve a sealing property between the lamp cover 40 (the main body portion 42) and the lamp housing 14, at a part of an opening side of the outer peripheral wall portion 46A (namely, a part that comes into contact with the inner rib 26), a plurality of protruding portions 46C (see FIG. 7) are preferably continuously or intermittently formed over an entire inner circumference of the outer peripheral wall portion 46A. As shown in FIG. 2, since the accommodating recessed groove 47 is fitted to the inner rib 26, the lamp cover 40 can be effectively prevented from slipping out from the lamp housing 14.

As shown in FIG. 2 and FIG. 3, at peripheral edges of the front side of the bottom wall portion 44, a pair of protruding portions (grip portions) 70 are formed so as to be opposite to each other. The protruding portions 70 protrude toward a direction away from the lamp housing 14 (the indoor side) and are configured to be gripped when the main body portion 42 is attached to the lamp housing 14. The protruding portions 70, 70 are formed at positions where at least one rigid body portion 65 prevents the deformation (bending) of the bottom wall portion 44 to maintain the rigidity at the periphery of the gas permeable membrane 60 when the protruding portions 70 are gripped to detach the lamp cover 40 from the lamp housing 14. Namely, the protruding portions 70 are formed so that the bottom wall portion 44 is does not deform (not bent) along a straight line passing the broken portions 68A and 68B.

At least one protruding portion 70 may be formed to the bottom wall portion 44. Since the protruding portion 70 is formed to the bottom wall portion 44, the lamp cover (the composite molded article) 40 is easily detached from the lamp housing (the attaching body) 14. Further, the protruding portion 70 is preferably formed in an inner peripheral side from the peripheral wall portion 46, so that a plurality of lamp covers can be piled up. Further, in an outer peripheral side of the protruding portion 70 on the front side of the bottom wall portion 44, a groove portion 72 is formed over an entire circumference of the bottom wall portion 44 for the purpose of suppressing sink.

Figure 7:
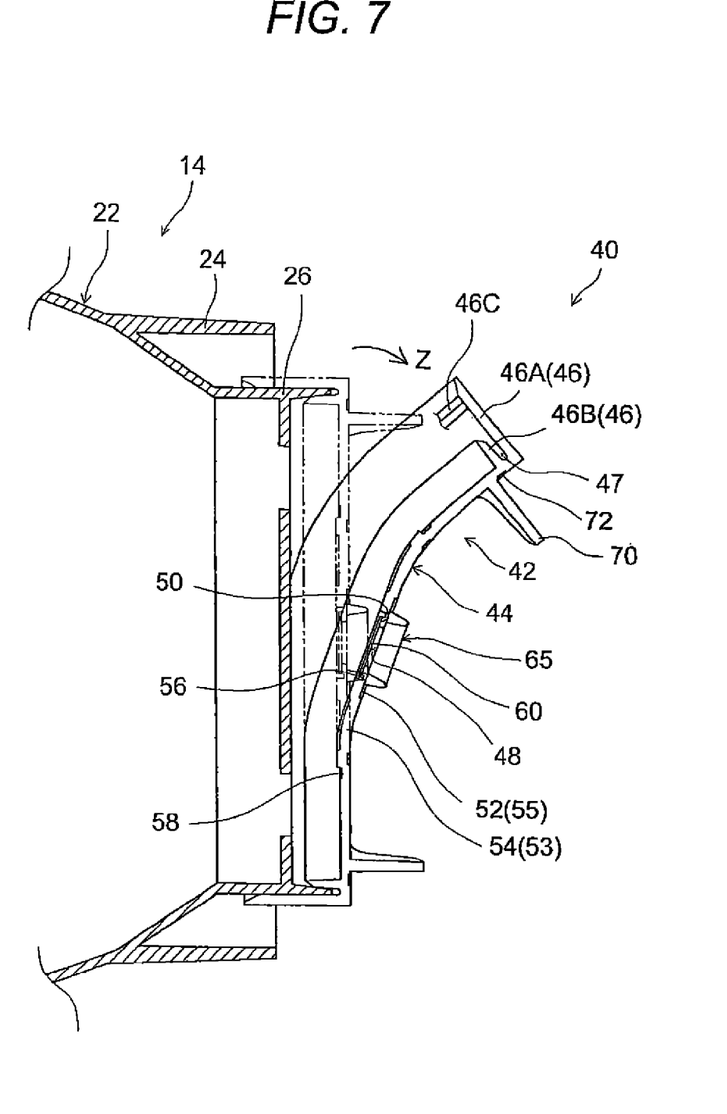
FIG. 7 is a sectional view showing a halfway state in which the lamp cover according to the one exemplary embodiment of the present invention is detached from the lamp housing.

Hereinafter, a function (operation, effect) of the lamp cover (the composite molded article) 40 having the rigid body portions 65 at the bottom wall portion 44 will be described in detail by referring to the drawings. FIG. 7 is a sectional view showing that the lamp cover 40 is located in an intermediate state in which the lamp cover 40 is detached from the lamp housing 14.

As shown in FIG. 7, when the protruding portion 70 is pulled in the direction shown by an arrow mark Z in FIG. 7 to detach the lamp cover 40 from the lamp housing 14, since the bending stress is applied to the bottom wall portion 44, the bottom wall portion 44 formed of the elastically deformable polymer material is deformed (bent). At this time, in the uneven part including the recessed portions 52 and the protruding portions 54 which are formed to the bottom wall portion 44, since the bottom wall portion 44 is deformed (bent) with respect to the recessed portion 52 as a bending point (a center of bending), a stress applied to the rigid body portion 65 that is formed at an inner peripheral side from the uneven part is reduced. Further, since at least a part of the rigid body portion 65 is formed so as to extend along the direction in which the deformation of the bottom wall portion 44 is prevented, namely, along a straight line that links the starting point of the deformation (the protruding portion 70) and the center of the bottom wall portion 44 (the vent hole 48), high rigidity is maintained and the deformation of the bottom wall portion 44 is prevented at the periphery of the rigid body portion 65. Therefore, to the gas permeable membrane connecting portion 50 and the gas permeable membrane 60 provided at the inner peripheral side of the rigid body portion 65, the bending stress is not applied, or even when the bending stress is applied to the gas permeable membrane connecting portion 50 and the gas permeable membrane 60, such stress does not give an influence to a connecting state of the gas permeable membrane connecting portion 50 and a physical state of the gas permeable membrane 60 can be stably maintained. Thus, the lamp cover 40 can be detached from the lamp housing 14 while successfully maintaining the physical state or the performance of the gas permeable membrane 60 and the gas permeable membrane connecting portion 50. Since the bottom wall portion 44 may be deformed (may be bent) at the first recessed groove 56 formed so as to surround the periphery of the gas permeable membrane connecting portion 50, the stress applied to the gas permeable membrane connecting portion 50 can be reduced more.

Figure 8:
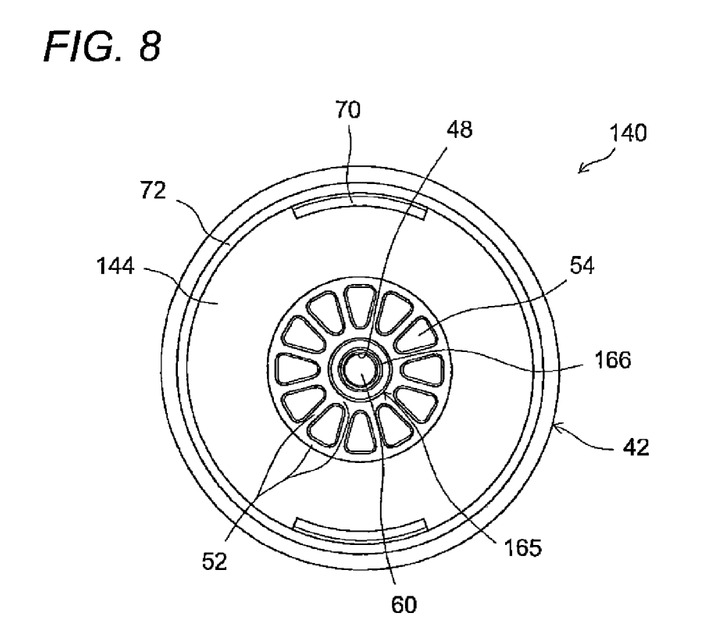
FIG. 8 is a plan view schematically showing a lamp cover according to another exemplary embodiment of the present invention.
Figure 9:
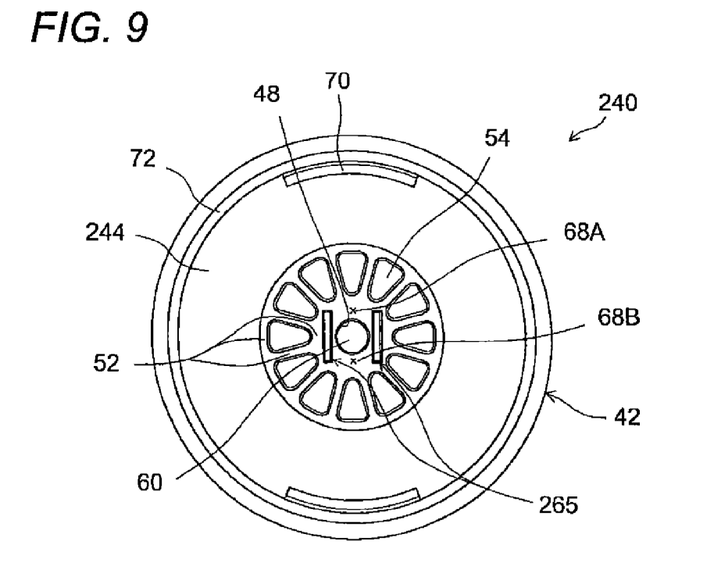
FIG. 9 is a plan view schematically showing a lamp cover according to another exemplary embodiment of the present invention.

The shape of the rigid body portion is not limited to the shape of the above-described exemplary embodiment. For example, the rigid portion can also be formed in a shape described in the following modified examples. FIG. 8 is a plan view schematically showing a lamp cover (a composite molded article) 140 according to a second exemplary embodiment of the present invention. FIG. 9 is a plan view schematically showing a lamp cover (a composite molded article) 240 according to a third exemplary embodiment of the present invention.

As shown in FIG. 8, on a surface of a front side of a bottom wall portion 144 according to the second exemplary embodiment, a protruding rigid body portion 165 which is more difficult to be deformed than the bottom wall portion 144 is formed at an outer peripheral part of a gas permeable membrane 60 (namely, in the vicinity of an outer periphery of a vent hole 48). Specifically, the protruding rigid body portion 165 is formed in a circular shape so as to continuously surround (completely surround without forming, for example, broken portions) an entire circumference of the vent hole 48 (for example, a gas permeable membrane connecting portion). According to such structure, the rigidity of the bottom wall portion 144 at the periphery of the gas permeable membrane 60 is more effectively maintained. Even when the bottom wall portion 144 is deformed (bent) in any direction during an attaching and detaching operation of a lamp cover 140, since the rigid body portion 165 can prevent the deformation, a state of the gas permeable membrane 60 and the gas permeable membrane connecting portion which are arranged at an inner peripheral side from the rigid body portion 165 can be effectively and preferably maintained. In order to discharge liquid (water droplets) sticking to the gas permeable membrane 60, an inner wall surface 166 of the rigid body portion 165 is preferably formed so as to be inclined by a predetermined angle α (α is an obtuse angle, for example, about 95 degrees to 135 degrees) similarly to the inner wall surface 66 according to the first exemplary embodiment.

As shown in FIG. 9, on a surface of a front side of a bottom wall portion 244 according to the third exemplary embodiment, rigid body portions 265 and 265 which are more difficult to be deformed than the bottom wall portion 244 are formed so as to be substantially parallel to each other at opposite positions and a vent hole 48 (for example, a gas permeable membrane connecting portion) is formed between them. Specifically, the rigid body portion 265 is formed in a protruding shape (a protrusion) extending in the shape of a straight line (for example, the shape of a rib or the shape of a wall). The rigid body portion 265 is formed at a position where a deformation (a bending) of the bottom wall portion 244 is prevented to maintain a rigidity at the periphery of a gas permeable membrane 60 when a protruding portion 70 is gripped to detach a lamp cover 40 from a lamp housing 14 (for example, a position facing a direction intersecting (typically, a direction substantially orthogonal to) a direction in which the protruding portion 70 extends on the same plane as that of the bottom wall portion 244). According to such structure, in addition to the same effects as those of the first exemplary embodiment, a structure of the rigid body portion 265 is simplified. The rigid body portion 265 is preferably formed so that its longitudinal direction is arranged along a line that links (a center of) the protruding portion 70 and (a center of) the vent hole 48. Namely, the rigid body portion 265 is formed so that a straight line which links the protruding portion 70 and the vent hole 48 is substantially parallel to a direction in which the rigid body portion 265 is extended. A parallel described herein is not limited to a precise parallel state (namely, when an angle formed by the straight line that links the protruding portion 70 with the vent hole 48 and the direction in which the rigid body portion 265 is extended is 0 degrees). Representatively, the angle formed by the straight line that links the protruding portion 70 and the vent hole 48 and the direction in which the rigid body portion 265 is extended is set to an angle smaller than about 45 degrees (for example, about 0 degrees to 20 degrees).

Figure 10:
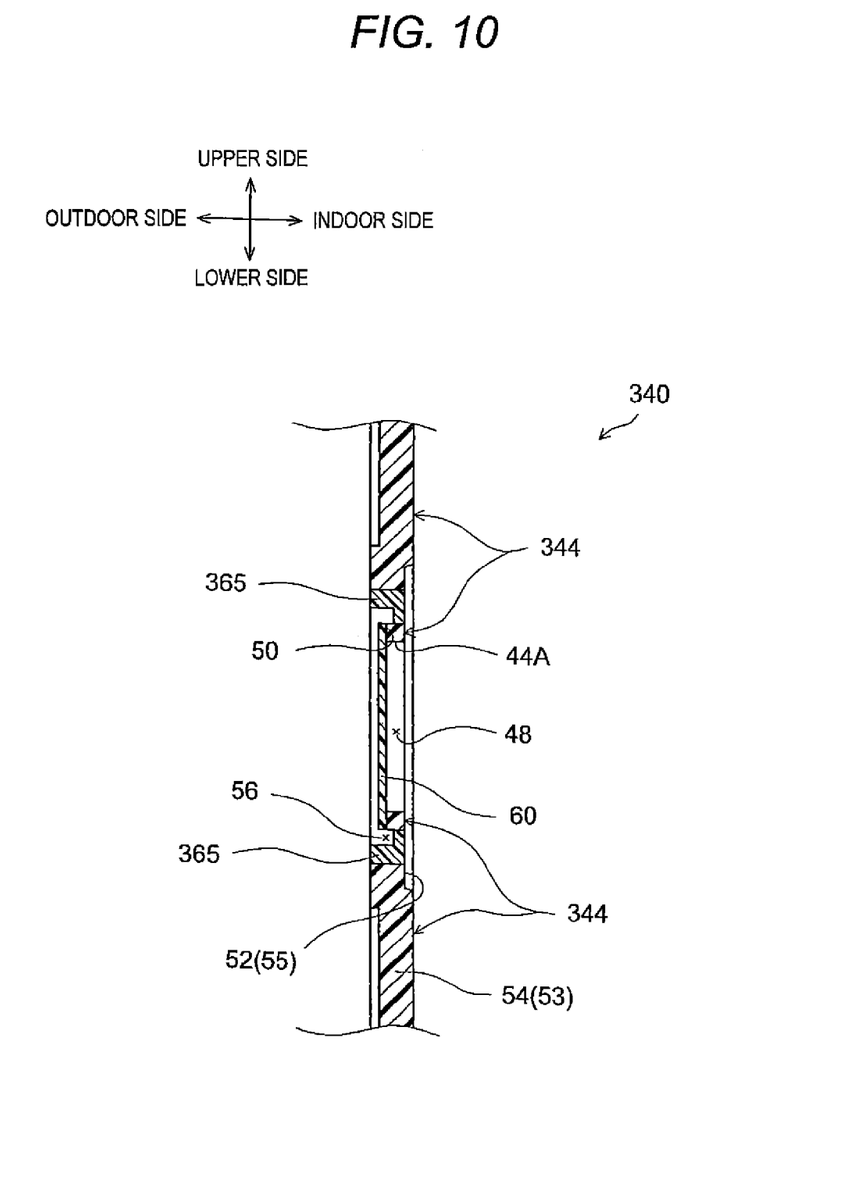
FIG. 10 is an enlarged sectional view of main parts showing the main parts of a lamp cover according to another exemplary embodiment of the present invention.

In the above-described various exemplary embodiments, the rigid body portion is formed so as to protrude from the bottom wall portion. However, the present invention is not limited thereto. FIG. 10 is an enlarged sectional view of main part showing the main part of a lamp cover 340 according to a fourth exemplary embodiment.

As shown in FIG. 10, a bottom wall portion 344 according to the present exemplary embodiment has rigid body portions 365 formed with a material higher in its hardness and rigidity than the bottom wall portion 344 at an outer peripheral part of a gas permeable membrane 60 (at the vicinity of an outer periphery of a vent hole 48). The rigid body portions 365 are inserted to the bottom wall portion 344 by an insert molding or fitting and formed integrally with the bottom wall portion 344. In accordance with such a structure, the same effects as those of the first exemplary embodiment are obtained.

The specific examples of the present invention have been described in detail by referring to the drawings. However, they merely show examples, and do not limit the scope of the claims. A technique described in the claims includes various modifications and changes of the specific examples as exemplified above.

For example, the rigid body portion may be formed on the surface of the bottom wall portion that faces the attaching body, so as to protrude to the attaching body.

Further, the present invention may be embodied for a case cover for covering a connector case that accommodates various kinds of electronic devices therein or a case cover of a cultivating case for cultivating crops such as mushroom.

The present invention provides illustrative, non-limiting aspects as follows:

(1) In a first aspect, there is provided a composite molded article including: a main body portion configured to be attached to and detached from an attaching body, the main body portion including, a bottom wall portion formed in a plate shape and formed of an elastically deformable polymer material, and a peripheral wall portion protruding so as to surround a peripheral edge of the bottom wall portion and formed of an elastically deformable polymer material; a vent hole passing through the bottom wall portion in a thickness direction of the bottom wall portion; and a gas permeable membrane integrally connected to the main body portion and is permeable to gas but is impermeable to liquid, wherein the gas permeable membrane is arranged to the bottom wall portion so as to cover the vent hole and connected to the bottom wall portion at a periphery of the vent hole, and wherein the bottom wall portion includes at least one rigid body portion which is more difficult to be deformed than the bottom wall portion at an outer peripheral part of the gas permeable membrane.

The composite molded article according to the first aspect has at least one rigid body portion which is more difficult to be deformed than the bottom wall portion in the outer peripheral part of the gas permeable membrane arranged so as to cover the vent hole formed to the bottom wall portion.

Therefore, according to the composite molded article of the first aspect, even if a bending stress is applied to the bottom wall portion so that the bottom wall portion is deformed when the main body portion is detached from the predetermined attaching body, a connecting portion (a gas permeable membrane connecting portion) of the gas permeable membrane and the bottom wall portion and the gas permeable membrane itself are hardly deformed by at least one rigid body formed in the outer peripheral part of a part to which the gas permeable membrane is connected. Thus, the gas permeable membrane itself and the gas permeable membrane connecting portion hardly receive an influence of the deformation of the bottom wall portion and the gas permeable membrane and the connecting portion can be prevented from being damaged and the performance of the gas permeable membrane can be prevented from being deteriorated. Further, since the main body portion itself has flexibility and can be elastically deformed, the main body portion can be easily attached to and detached from the attaching body.

According to the composite molded article of the first aspect, a maintenance operation such as an attaching and detaching operation with respect to the attaching body can be easily carried out. Further, even when the main body portion itself is deformed during the above-described operation, a physical state or a performance of the gas permeable membrane and the gas permeable membrane connecting portion connected to the main body portion can be stably maintained.

(2) In a second aspect, there is provided the composite molded article according to the first aspect, wherein at least a part of the rigid body portion is arranged in a direction that prevents deformation of the bottom wall portion when the bottom wall portion is caused to be deformed in a direction away from the attaching body from a state where the main body portion is attached to the attaching body.

According to the second aspect, since the rigid body portion is extended and formed so as to be arranged in the direction in which the deformation of the bottom wall portion is prevented, even when the bottom wall portion is deformed, the rigidity of the bottom wall portion at the periphery of the gas permeable membrane can be successfully maintained and stress can be prevented from being applied to the gas permeable membrane itself.

(3) In a third aspect, there is provided the composite molded article according to the first aspect, wherein the rigid body portion is formed by at least one partially thick part of the bottom wall portion.

According to the third aspect, the rigid body portion can be easily formed, and in addition thereto, the physical state or the performance of the gas permeable membrane and the gas permeable membrane connecting portion can be more stably maintained by the formed rigid body portion.

(4) In a fourth aspect, there is provided the composite molded article according to the first aspect, wherein the rigid body portion is formed so as to protrude toward a direction away from the attaching body when the main body portion is attached to the attaching body.

According to the fourth aspect, even if a bending stress is applied to the bottom wall portion when the main body portion is detached from the attaching body, since the bottom wall portion difficult to be deformed and the rigidity of the bottom wall portion at the periphery of the gas permeable membrane can be more stably maintained, the deformation of the gas permeable membrane itself can be more effectively prevented.

(5) In a fifth aspect, there is provided the composite molded article according to the third aspect, wherein the rigid body portion is formed in a protruding shape.

According to the fifth aspect, the deformation of the gas permeable membrane itself can be more effectively prevented by the rigid body portion having a small volume (typically, the rigid body portion formed in the shape of a straight line or a curved line so as to be extended in the shape of a rib or a wall).

(6) In a sixth aspect, there is provided the composite molded article according to the first aspect, wherein the rigid body portion is formed in a circular shape or a circular arc shape so as to surround the periphery of the vent hole.

According to the sixth aspect, the rigidity of the bottom wall portion at the periphery of the gas permeable membrane can be more effectively maintained and the stress can be more effectively prevented from being applied to the gas permeable membrane itself.

(7) In a seventh aspect, there is provided the composite molded article according to the first aspect, wherein a plurality of the rigid body portions are formed at the outer peripheral part of the gas permeable membrane, and wherein the rigid body portions are arranged to be spaced from each other so that at least one broken portion is formed between the rigid body portions.

According to the seventh aspect, the deformation of the gas permeable membrane can be more effectively prevented by the plurality of rigid body portions formed in the outer peripheral part of the gas permeable membrane. Further, the outer peripheral part of the gas permeable membrane is prevented from being continuously surrounded, and for example, liquid sticking to the outer surface of the gas permeable membrane can be easily discharged to an external of the rigid body portions from the broken portion. Namely, according to the composite molded article having this structure, an inconvenience can be prevented which may occur due to the outer peripheral part of the gas permeable membrane (the gas permeable membrane connecting portion) being continuously surrounded by the rigid body portion at the periphery thereof, for example, an inconvenience that the liquid (water droplets) sticking to the gas permeable membrane is blocked by the rigid body portion at the periphery to stay on the outer surface of the gas permeable membrane for a long time (an inconvenience that a gas permeability is prevented by the sticking liquid).

(8) In an eighth aspect, there is provided the composite molded article according to the seventh aspect, wherein the broken portion is formed lower to a lower end part of the vent hole when the main body portion is attached to the attaching body.

According to the eighth aspect, the liquid sticking to the gas permeable membrane can be more effectively discharged to the external from the broken part.

(9) In the ninth aspect, there is provided the composite molded article according to the first aspect, wherein the gas permeable membrane is integrally connected to a surface of the bottom wall portion that faces the attaching body when the main body portion is attached to the attaching body.

According to the ninth aspect, since the connecting portion of the gas permeable membrane and the bottom wall portion is provided to a surface of the bottom wall portion located at the side of the attaching body, that is, the surface facing the attaching body, when the main body portion is attached to the attaching body, the gas permeable membrane connecting portion is restrained form coming into contact with an external member (namely, other member than the attaching body and the composite molded article) and the gas permeable membrane itself or the gas permeable membrane connecting portion can be restrained form being damaged.

(10) In a tenth aspect, there is provided the composite molded article according to the first aspect, wherein at least one protruding portion, which protrudes in a direction away from the attaching body and is configured to be gripped when the main body portion is attached to the attaching body, is formed at an peripheral edge of the bottom wall portion.

According to the tenth aspect, the main body portion can be detached from the attaching body and the composite molded article can be easily held and carried.

(11) In an eleventh aspect, there is provided the composite molded article according to the tenth aspect, wherein the rigid body portion is formed along a line that links the protruding portion and the vent hole.

According to the eleventh aspect, since the rigid body portion is formed so as to prevent the bending stress applied to the bottom wall portion when the protruding portion is gripped to detach the main body portion from the attaching body, the rigidity of the bottom wall portion in the periphery of the gas permeable membrane is maintained. Thus, the deformation of the gas permeable membrane can be more effectively prevented against the deformation of the main body portion when the protruding portion is gripped to detach the main body portion from the attaching body. Herein, "along a line" means that a straight line which links the protruding portion and the vent hole extends in substantially the same direction as the direction in which the rigid body portion extends and is not limited to a precise parallel state (namely, a state that an angle formed by the straight line that links the protruding portion and the vent hole and the direction in which the rigid body portion extends is 0 degrees). Generally, the above-described state means a state that the angle formed by the straight line that links the protruding portion and the vent hole and the direction in which the rigid body portion extends is set to an angle smaller than about 45 degrees (for example, about 0 degrees to 20 degrees).

(12) In a twelfth aspect, there is provided the composite molded article according to the first aspect, wherein an uneven part is provided at a peripheral part of the rigid body portion, the uneven part including a recessed portion formed in a recessed shape and a protruding portion formed in a protruding shape.

According to the twelfth aspect, when the bending stress is applied to the bottom wall portion, since the bending stress is reduced in the uneven part, the stress applied to the rigid body portion can be reduced. As a result, the rigidity of the bottom wall portion at the periphery of the gas permeable membrane can be maintained and the deformation of the gas permeable membrane can be effectively prevented.

(13) In a thirteenth aspect, there is provided the composite molded article according to the twelfth aspect, wherein a thickness of the recessed portion is substantially the same as a thickness of the protruding portion.

According to the thirteenth aspect, since the thickness of the recessed portion is substantially the same as the thickness of the protruding portion, a deformation (for example, a sink mark or a warp) due to the difference in thicknesses can be suppressed while and after the bottom wall portion is formed.

(14) In a fourteenth aspect, there is provided the composite molded article according to the twelfth aspect, wherein the recessed portion and the protruding portion are respectively formed symmetrically with respect to a center of the vent hole or linearly symmetrically with respect to a center line of the vent hole.

According to the fourteenth aspect, since unevenness hardly arises in a direction of attaching the composite molded article, the main body portion can be attached to the attaching body without requiring an excessive attention.

(15) In a fifteenth aspect, there is provided the composite molded article according to the twelfth aspect, wherein the recessed portion is formed to radiate from the vent hole, and wherein the protruding portions are formed at both sides of the recessed portions.

According to the fifteenth aspect, even when the bottom wall portion is deformed in any direction, the bending stress generated by the deformation of the bottom wall portion can be effectively reduced at the uneven parts.

(16) In a sixteenth aspect, there is provided the composite molded article according to the first aspect, wherein a recessed groove, which can be fitted to a peripheral edge of the attaching body, is formed to the peripheral wall portion.

According to the sixteenth aspect, the main body portion can be attached to the attaching body with a simple structure, and since the recessed groove fitted to the peripheral edge of the attaching body holds the attaching body, the main body portion can be prevented from slipping out from the attaching body.

(17) In a seventeenth aspect, there is provided the composite molded article according to the first aspect, wherein the main body portion and the rigid body portion are formed of the same material.

According to the seventeenth aspect, since the number of kinds of materials to be used is not increased, a production cost can be avoided from being increased and the molded article having the rigid body portion and the main body portion made of the same material can be easily manufactured.

(18) In an eighteenth aspect, there is provided the composite molded article according to the first aspect, wherein the bottom wall portion is formed in a disk shape, the peripheral wall portion is formed in a tubular shape so as to protrude in a single direction from a peripheral edge of the bottom wall portion and the main body portion is formed in a cylindrical shape by the disk shaped bottom wall portion and the tubular peripheral wall portion.

According to the eighteenth aspect, an operation for attaching the main body portion to the attaching body is easy and a sealing property between the attaching body and the main body portion can be ensured by a simple shape.

(19) In a nineteenth aspect, there is provided the composite molded article according to the first aspect, wherein the attaching body is a lamp housing, and wherein the composite molded article is a lamp cover which can be attached to and detached from the lamp housing.

According to the lamp cover (composite molded article) of the nineteenth aspect, water droplets or dust can be prevented from entering the lamp housing and the performance of the gas permeable membrane can be maintained even when attaching and detaching operation is repeated to the lamp housing.

What is claimed is:

1. A system comprising:
    an attaching body; and
    a composite molded article comprising:
        a main body portion configured to be attached to and detached from the attaching body, the main body portion including:
            a bottom wall portion formed in a plate shape and formed of an elastically deformable polymer material, and
            a peripheral wall portion protruding so as to surround a peripheral edge of the bottom wall portion and being formed of an elastically deformable polymer material;
        a vent hole passing through the bottom wall portion in a thickness direction of the bottom wall portion; and
        a gas permeable membrane that is integrally connected to the main body portion, is permeable to gas, but is impermeable to liquid,
    wherein the gas permeable membrane is arranged at the bottom wall portion so as to cover the vent hole and is connected to the bottom wall portion at a periphery of the vent hole,
    wherein the bottom wall portion includes at least one rigid body portion, which is more difficult to be deformed than other parts of the bottom wall portion, at an outer peripheral part of the gas permeable membrane,
    wherein at least one protruding portion, which protrudes from the bottom wall in a direction opposite the protruding direction of the peripheral wall portion and away from the attaching body, and which is configured to be gripped when the main body portion is attached to the attaching body, is formed at a peripheral edge of the bottom wall portion, and
    wherein the at least one rigid body portion extends linearly so as to be parallel to a line that links the at least one protruding portion and the vent hole.

2. The system according to claim 1,
    wherein at least a part of the at least one rigid body portion is arranged in a direction that prevents deformation of the bottom wall portion when the bottom wall portion is caused to be deformed in a direction away from the attaching body from a state where the main body portion is attached to the attaching body.

3. The system according to claim 1,
    wherein the at least one rigid body portion is formed so as to protrude in the direction away from the attaching body when the main body portion is attached to the attaching body.

4. The system according to claim 1,
    wherein a plurality of the rigid body portions are formed at the outer peripheral part of the gas permeable membrane,
    wherein the rigid body portions are arranged to be spaced from each other so that at least one broken portion is formed between the rigid body portions, and
    wherein the at least one broken portion is formed lower than a lower end part of the vent hole when the main body portion is attached to the attaching body.

5. The system according to claim 1,
    wherein the gas permeable membrane is integrally connected to a surface of the bottom wall portion that faces the attaching body when the main body portion is attached to the attaching body.

6. The system according to claim 1,
    wherein the bottom wall portion includes an uneven part at a peripheral part of the at least one rigid body portion, the uneven part including a portion protruding in the thickness direction and a portion recessed from a surface of the protruding portion in the thickness direction.

7. The system according to claim 1,
    wherein the attaching body is a lamp housing, and
    wherein the composite molded article is a lamp cover that can be attached to and detached from the lamp housing.

* * * * *